United States Patent
Dockser

(10) Patent No.: US 7,793,072 B2
(45) Date of Patent: Sep. 7, 2010

(54) VECTOR EXECUTION UNIT TO PROCESS A VECTOR INSTRUCTION BY EXECUTING A FIRST OPERATION ON A FIRST SET OF OPERANDS AND A SECOND OPERATION ON A SECOND SET OF OPERANDS

(75) Inventor: Kenneth Dockser, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1419 days.

(21) Appl. No.: 10/699,571

(22) Filed: Oct. 31, 2003

(65) Prior Publication Data

US 2005/0097299 A1 May 5, 2005

(51) Int. Cl.
*G06F 15/82* (2006.01)

(52) U.S. Cl. .......................................... 712/4
(58) Field of Classification Search ........................ 712/4
See application file for complete search history.

(56) References Cited

U.S. PATENT DOCUMENTS

| | | | |
|---|---|---|---|
| 5,187,796 A * | 2/1993 | Wang et al. ...................... 712/4 |
| 5,197,140 A | 3/1993 | Balmer | |
| 5,881,307 A * | 3/1999 | Park et al. ...................... 712/23 |
| 5,901,301 A * | 5/1999 | Matsuo et al. .............. 712/212 |
| 5,922,066 A * | 7/1999 | Cho et al. .................... 712/204 |
| 5,978,838 A | 11/1999 | Mohamed et al. | |
| 6,058,465 A * | 5/2000 | Nguyen .......................... 712/7 |
| 6,061,787 A * | 5/2000 | Seshan ....................... 712/244 |
| 6,269,435 B1 | 7/2001 | Dalley et al. | |
| 6,438,680 B1 * | 8/2002 | Yamada et al. .............. 712/210 |
| 6,557,022 B1 * | 4/2003 | Sih et al. ..................... 708/523 |
| 6,915,411 B2 * | 7/2005 | Moreno et al. ................ 712/22 |
| 6,920,546 B2 * | 7/2005 | Gochman et al. ........... 712/208 |
| 7,142,669 B2 * | 11/2006 | Dworkin et al. ............... 380/28 |
| 2002/0004809 A1 * | 1/2002 | Golliver et al. ............. 708/622 |
| 2005/0283592 A1 * | 12/2005 | Tromp et al. ................ 712/226 |

* cited by examiner

*Primary Examiner*—Aimee J Li
(74) *Attorney, Agent, or Firm*—Dillon & Yudell LLP

(57) ABSTRACT

A microprocessor including an execution unit enabled to execute an asymmetric instruction, where the asymmetric instruction includes a set of operand fields and an operation code (opcode). The execution unit is configured to interpret the opcode to perform a first operation on a first set of data indicated by the set of operand fields and to perform a second operation on a second set of data indicated by the set of operand fields, wherein the set of operand fields indicate different sets of data with respect to the first and second operations and further wherein the first and second operations are mathematically different.

20 Claims, 3 Drawing Sheets

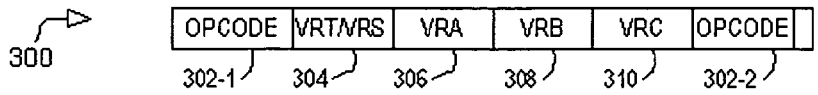

FIG 3

| | |
|---|---|
| PARALLEL ADD/SUBTRACT | Ap+Bp->Tp, As+Bs->Ts |
| MULTIPLY | |
| PARALLEL | ApCp->Tp, AsCs->Ts |
| CROSS | AsCp->Tp, ApCs->Ts |
| CROSS COPY PRIMARY | ApCp->Tp, ApCs->Ts |
| CROSS COPY SECONDARY | AsCp->Tp, AsCs->Ts |
| MULTIPLY AND ADD/SUBSTRACT | |
| PARALLEL | ApCp+Bp->Tp, AsCs+Bs->Ts |
| PARALLEL NEGATE | -(ApCp+Bp)->Tp, -(AsCs+Bs)->Ts |
| PARALLEL SUBTRACT | ApCp-Bp->Tp, AsCs-Bs->Ts |
| PARALLEL NEGATE SUBTRACT | -(ApCp-Bp)->Tp, -(AsCs-Bs)->Ts |
| CROSS | AsCp+Bp->Tp, ApCs+Bs->Ts |
| CROSS NEGATE | -(AsCp+Bp)->Tp, -(ApCs+Bs)->Ts |
| CROSS SUBTRACT | AsCp-Bp->Tp, ApCs-Bs->Ts |
| CROSS NEGATE SUBTRACT | -(AsCp-Bp)->Tp, -(ApCs-Bs)->Ts |
| CROSS REPLICATE PRIMARY | ApCp+Bp->Tp, ApCs+Bs->Ts |
| CROSS REPLICATE PRIMARY NEGATE | -(ApCp+Bp)->Tp, -(ApCs+Bs)->Ts |
| CROSS REPLICATE PRIMARY SUBTRACT | ApCp-Bp->Tp, ApCs-Bs->Ts |
| CROSS REPLICATE PRIMARY NEGATE SUBTRACT | -(ApCp-Bp)->Tp, -(ApCs-Bs)->Ts |
| CROSS REPLICATE SECONDARY | AsCp+Bp->Tp, AsCs+Bs->Ts |
| CROSS REPLICATE SECONDARY NEGATE | -(AsCp+Bp)->Tp, -(AsCs+Bs)->Ts |
| CROSS REPLICATE SECONDARY SUBTRACT | AsCp-Bp->Tp, AsCs-Bs->Ts |
| CROSS REPLICATE SECONDARY NEGATE SUB | -(AsCp-Bp)->Tp, -(AsCs-Bs)->Ts |
| ASYMMETRIC MULTIPLY AND ADD/SUB | |
| CROSS COPY PRIMARY SUB PRIMARY | -(ApCp-Bp)->Tp, ApCs+Bs->Ts |
| CROSS COPY SECONDARY SUB PRIMARY | -(AsCp-Bp)->Tp, AsCs+Bs->Ts |
| CROSS COPY PRIMARY SUB SECONDARY | ApCp+Bp->Tp, -(ApCs-Bs)->Ts |
| CROSS COPY SECONDARY SUB SECONDARY | AsCp+Bp->Tp, -(AsCs-Bs)->Ts |
| COMPLEX MULTIPLY AND ADD/SUBSTRACT | |
| CROSS COMPLEX SUB PRIMARY MULT ADD | -(AsCs-Bp)->Tp, AsCp+Bs->Ts |
| CROSS COMPLEX SUB SECONDARY MULT ADD | AsCs+Bp->Tp, -(AsCp-Bs)->Ts |
| CROSS COMPLEX MULT ADD | AsCs+Bp->Tp, AsCp+Bs->Ts |
| CROSS COMPLEX NEGATIVE MULT SUBTRACT | -(AsCs-Bp)->Tp, -(AsCp-Bs)->Ts |
| MOVE, LOAD, STORE | |
| CROSS MOVE | Bp->Ts, Bs->Tp |
| LOAD DOUBLE WORD | DW[EA]->Tp, DW[EA+8]->Ts |
| LOAD DOUBLE WORD CROSS | DW[EA+8]->Tp, DW[EA]->Ts |
| LOAD DOUBLE WORD REPLICATE | DW[EA]->Tp,Ts |
| STORE DOUBLE WORD | Sp->DW[EA], Ss->DW[EA+8] |
| STORE DOUBLE WORD CROSS | Sp->DW[EA+8], Ss->DW[EA] |
| STORE DOUBLE WORD REPLICATE | Sp,Ss->DW[EA] |

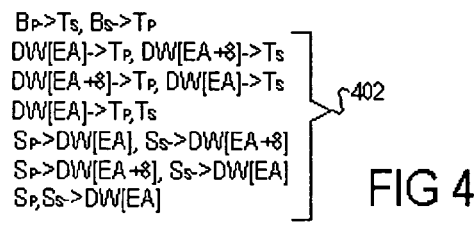

FIG 4

VECTOR EXECUTION UNIT TO PROCESS A VECTOR INSTRUCTION BY EXECUTING A FIRST OPERATION ON A FIRST SET OF OPERANDS AND A SECOND OPERATION ON A SECOND SET OF OPERANDS

BACKGROUND

1. Field of the Present Invention

The present invention is in the field of microprocessors and more particularly in the field of microprocessors with single instruction, multiple data (SIMD) capability.

2. History of Related Art

Single instruction stream multiple data streams (SIMD) computers and vector processors are both useful in computationally intensive applications such as signal processing. In a SIMD computer, two or more processors (or functional units within a processor) execute the same instruction on different data streams. A vector processor is a processor that can operate on an entire vector with one instruction. Historically, SIMD computers and vector processors have been limited to "strictly parallel" execution modes. For purposes of this disclosure, strictly parallel execution refers to performing the same operation on each of the different data streams (in the case of SIMD) or on each of the elements in a vector (in the case of a vector processor).

Many computationally intensive applications, however, require the performance of related but different operations, in parallel, on related data structures. Complex math is an example of such an application. In complex math, each variable includes a real element and an imaginary element. Due in large to the sign inversion that occurs when a pair of imaginary components are multiplied, complex math computations require different operations on different parts of the variables. Complex math is but one example of an application that is somewhat constrained by the strictly parallel organization of conventional SIMD machines and vector processors. It would be desirable to implement a processor enabling vector-type processing on related data structures while permitting variations in the operations that are performed on the data structures.

SUMMARY OF THE INVENTION

The objective identified above is achieved according to the present invention by a microprocessor including an execution unit enabled to execute an asymmetric instruction, where the asymmetric instruction includes a set of operand fields and an operation code (opcode). The execution unit is configured to interpret the opcode to perform a first operation on a first set of data indicated by the set of operand fields and to perform a second operation on a second set of data indicated by the set of operand fields, wherein the set of operand fields indicate different sets of data with respect to the first and second operations and further wherein the first and second operations are mathematically different.

BRIEF DESCRIPTION OF THE DRAWINGS

Other objects and advantages of the invention will become apparent upon reading the following detailed description and upon reference to the accompanying drawings in which:

FIG. 3 is a conceptual illustration of an instruction format for use in the processor of FIG. 1 and vector unit of FIG. 2; and FIG. 4 is a listing of exemplary instructions supported by the processor of FIG. 1 using the vector unit of FIG. 2.

Figure 1:
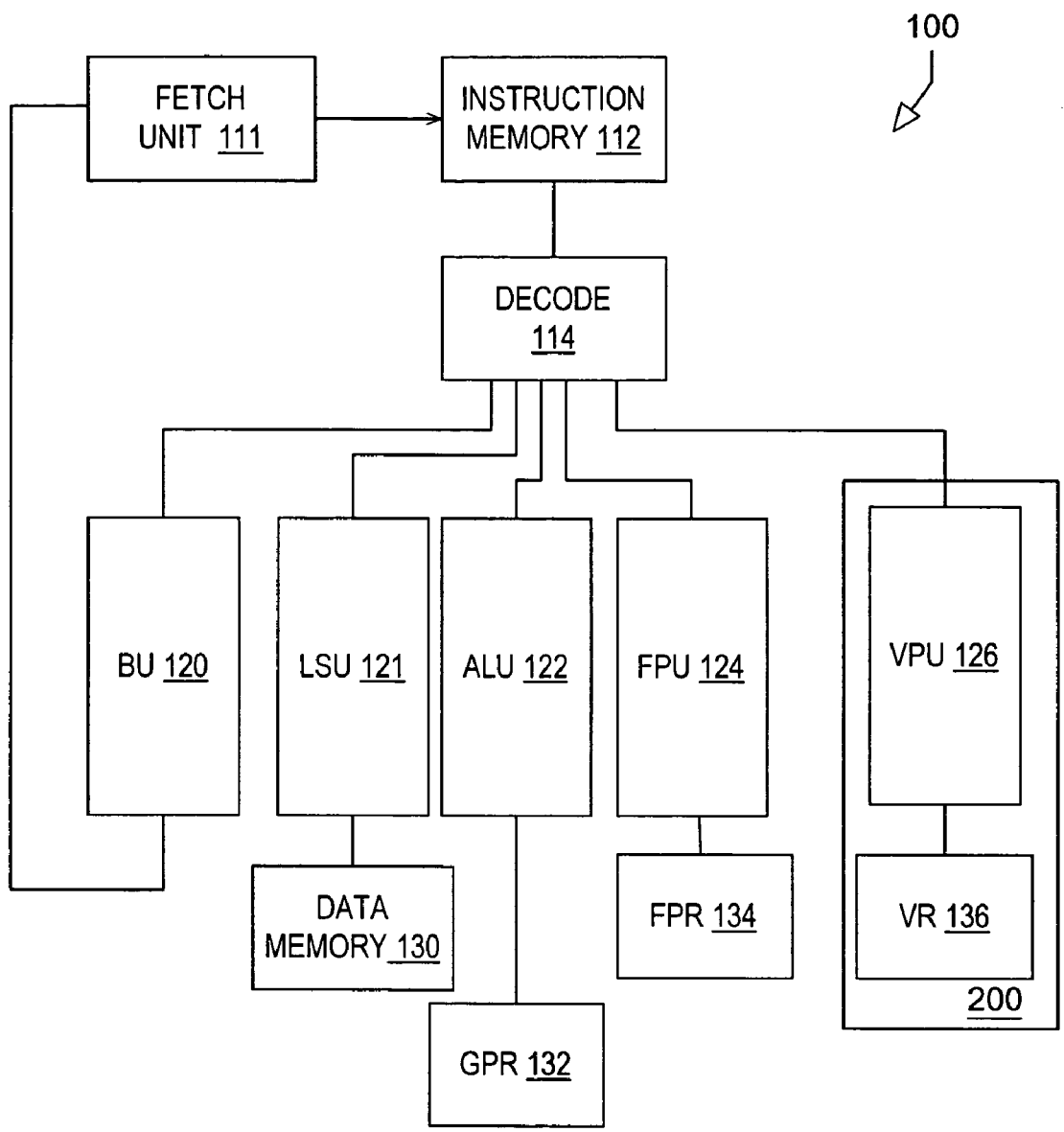
FIG. 1 is a block diagram of selected elements of a processor according to one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates a data processing device and system that supports one or more "asymmetric" instructions. Asymmetric instructions, as used herein, are instructions that produce parallel, but different, processing of related data elements.

Referring now to the drawings, FIG. 1 illustrates selected elements of a processing device (processor) 100 according an embodiment of the present invention emphasizing the use of a vector unit 200 to achieve asymmetric SIMD functionality. In the depicted embodiment, processor 100 is shown as including a fetch unit 111 that provides a next instruction address 113 to an instruction memory 112. Instruction memory 112 responds to the next instruction address signal 113 by providing processor-executable instructions to a decode unit 114. Decode unit 114 is responsible for evaluating the operation codes (opcodes) of the received instructions and for fetching operands from the appropriate register files (connections between decode unit 114 and register files 132, 134, and 136 are not shown in FIG. 1 to improve the clarity of the drawing).

The depicted embodiment of processor 100 includes a number of functional or execution units. These units include a branch unit (BU) 120, a load/store unit (LSU) 121, an arithmetic logic unit (ALU) 122, a floating-point unit (FPU) 124, and a vector unit 200. In addition, processor 100 includes a data memory 130 accessible to LSU 121, a general purpose register (GPR) file 132 accessible to ALU 122, and a floating-point register (FPR) file 134 accessible to FPU 124.

Branch unit 120 evaluates the results of branch instructions to provide fetch unit 111 with a next instruction address when a branch is taken. LSU 121 is configured to retrieve data from and store data to data memory 130. Processor 100 is a load-store processor in which access to data is restricted to a class of load/store instructions. All arithmetic instructions operate on data in the various register files. ALU 122 is an arithmetic unit for performing operations on scalar, integer data. FPU 124 is used to perform scalar floating-point instructions on data stored in FPR file 134. Execution units 120 through 124 will be familiar to those skilled in the design of general purpose microprocessors.

In addition to the conventional execution units 120 through 124, processor 100 according to one embodiment of the invention includes vector unit 200. Vector unit 200 is configured to support the execution of a single vector-type instruction that produces a first operation on a first set of data elements and a second operation on a second set of data elements where the first and second operations are different. Thus, vector unit 200 supports asymmetric vector instructions. Moreover, although the following description is presented in the context of a vector unit 200 that includes a vector register file, the invention encompasses, with appropriate modifications, scalar register file implementations.

Figure 2:
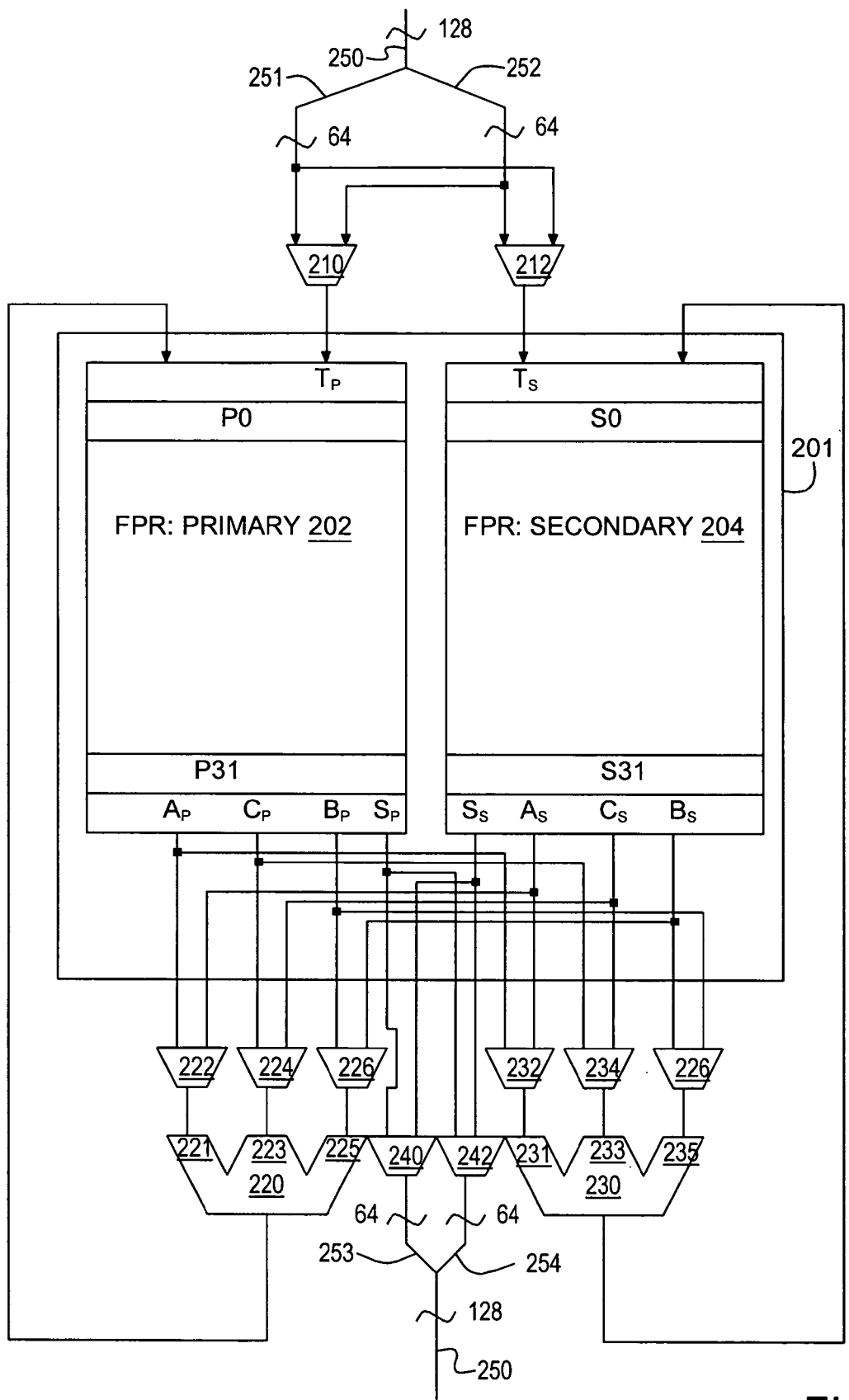
FIG. 2 illustrates selected element of a vector unit suitable for use in the processor of FIG. 1.

Turning now to FIG. 2, selected elements of vector unit 200 of FIG. 1 are depicted to emphasize the unit's flexibility. In the depicted embodiment, a vector register file 201 is implemented with a primary FPR 202 and a secondary FPR 204. Thus, the depicted implementation of vector register file 201 has a "rank" of two. Other implementations may employ a vector register file with more than two register elements per entry. Operation of vector unit 200 will be illustrated using a floating-point, complex arithmetic application. In this context, each of registers in primary and secondary registers 202 and 204 are preferably floating-point registers of 64 bits in width to accommodate double precision floating-point calculations.

Data is retrieved from and stored back to a data memory (not shown in FIG. 2) via a data bus 250. The depicted implementation of data bus 250 is a 128-bit data bus capable of carrying two 64-bit doublewords. The data memory to which vector unit 200 is connected may be the data memory 130 of FIG. 1 or it may be a dedicated vector data memory that is not depicted. In the context of a complex arithmetic application, 128-bit data bus 250 may carry, at any given time, a 64-bit floating-point representation of a real portion of a complex number and a 64-bit floating-point representation of an imaginary portion of a complex number. In such a case, data arriving via data bus 250 may be stored such that the 64-bit real portion of the complex number is stored in one of the 32 registers (P0 through P31) of primary register file 202 while the 64-bit imaginary portion of the complex number is stored in the corresponding register (S0 through S31) of secondary register file 204. If the real portion of a complex number is stored in register P0 of primary register file 202, the imaginary portion of the number is stored in register S0 of secondary register file 204.

An important feature of vector unit 200 is emphasized by the multiplexers 210 and 212 at the input to vector register file 201. These multiplexers, in conjunction with a set of supported instructions, enable reordering and/or replication of data arriving via bus 250 as it is stored into register file 201. Similarly, the multiplexers 240 and 242 at the output of vector register file 201 enable reordering or replicating of data as it is stored back to the memory via bus 250.

As it is implemented in FIG. 2, for example, the 128-bit bus 250 divides into a pair of 64-bit data busses 251 and 252 at the input to vector register file 201. The output of vector register file input multiplexer 210 provides an input to primary register file 202 while the output of multiplexer 212 provides an input to secondary register file 204. Multiplexers 210 and 212 both receive the first and second 64-bit busses 251 and 252 as inputs. The select signals (not depicted explicitly) of each multiplexer determine which of the two busses (251 or 252) will provide the input to the corresponding register file (202 or 204).

In the depicted implementation, in which each vector register in vector register file 201 includes two elements (i.e., the primary vector register element and the secondary vector register element), multiplexers 210 and 212 enable at least four possible conditions, namely, data from bus 251 is stored in primary register file 202 and data from bus 252 is stored in secondary register file 204; bus 251 data is stored in both of the register files (replication); bus 252 data is stored in both of the register files (a second replication example); and bus 251 data is stored in secondary register file 204 while bus 252 data is stored in primary register file 202 (reordering of data).

Data reordering and replication as data is stored back to memory is implemented with a pair of output multiplexers 240 and 242, which each receive a pair of 64-bit inputs, namely, the contents of a primary side source register ($S_P$) and the contents of a secondary side source register ($S_S$). The outputs of multiplexers 240 and 242 are 64-bit busses 253 and 254 respectively. Busses 253 and 254 are merged into the 128-bit outbound data bus 250 that delivers data to the data memory on a vector register store command. The select signals for multiplexers 240 and 242 (not shown) determine whether the busses 253 and 254 carry data from primary vector register file 202 or secondary vector register file 204. Accordingly, dependent on the state of multiplexers 240 and 242, outbound data bus 250 may carry primary side data on one half of bus 250, secondary side data on the other half (in either order), primary side data on both sides of bus 250 or secondary side data on both sides of data bus 250.

Reordering and duplication of data as it is loaded into and stored back to memory from vector register 201 has the potential to improve the efficiency and performance of certain application and calculations. Moreover, data reordering and duplication, as enabled by the vector unit 200 depicted in FIG. 2 is achieved automatically depending upon the state of the multiplexer select signals. These select signals, in turn, can be controlled via bits in the opcode of a vector register load. Referring to FIG. 3, an exemplary format for an instruction 300 suitable for implementing data reordering and duplication during vector register load (and store) instructions is depicted. In the depicted embodiment, instruction 300 includes a two part opcode field 302-1 and 302-2, a target/source register field 304, an "A" operand register field 306, a "B" operand register field 308, and a "C" register operand field 310. For use with the embodiment of register file 201 as depicted in FIG. 2, the target/source register field 304 and each of the register operands field 306, 308, and 310 each comprise five bits for specifying one of the 32 registers. In this implementation, a 32-bit instruction would include 20 bits for specifying registers and 12 bits remaining for specifying opcodes and possibly other control information.

Referring to FIG. 4, an exemplary table of some of the instructions supported by vector unit 200 is presented to emphasize selected elements of the invention. With respect to the load/store reorder/duplication capabilities, for example, vector unit 200 supports a set of instructions (indicated by reference numeral 402) that includes load/store double word instructions, load/store cross instructions, and load/store replicated instructions. The load/store cross instructions, as indicated by their corresponding functional descriptions, achieves reordering of data (relative to the conventional load/store doubleword instructions) by loading/storing the first 64-bits of data bus 250 into/from secondary register file 204 (FIG. 2) while loading/storing the second 64-bits into/from primary register file 202.

Vector unit 200 as depicted in FIG. 2 includes additional elements that emphasize an additional feature, namely, the ability to perform cross-type arithmetic instructions and asymmetric instructions using a single instruction. Specifically, the depicted implementation of vector unit 200 includes a pair of 3-input arithmetic units, a primary ALU 220 and a secondary ALU 230. In an embodiment suitable for use in complex math and other intensive calculations, ALU's 220 and 230 are both double precision floating-point units each of which can receive three floating-point inputs. Moreover, each of the floating-point unit inputs can accept data from either primary side register file 202 or from secondary side register file 204. Specifically, primary ALU 220 includes an "A" input 221 connected to the output of an "A" multiplexer 222, a "C"

input 223 connected to the output of a "C" multiplexer 224, and a "B" input 225 connected to the output of a "B" multiplexer 226. Similarly, secondary ALU 230 includes an "A" input 231 connected to the output of an "A" multiplexer 232, a "C" input 233 connected to the output of a "C" multiplexer 234, and a "B" input 235 connected to the output of a "B multiplexer 236. This arrangement of multiplexers beneficially enables primary side ALU 220 and secondary ALU 230 to select inputs from either side of vector register file 201. This architecture provides the support for a variety of compound, cross-register, and asymmetric vector floating-point instructions.

Referring to FIG. 4 again, the exemplary instruction set 400 supported by vector unit 200 includes compound, parallel instructions such as the Vector Parallel Mult/Add Instruction (403) that performs a floating-point multiplication and add operation on a set of three input variables in parallel (i.e., on each side of vector register file 201) such that a result is generated and stored in primary register file 202 based on inputs retrieved from register file 202 while a second result is generated and stored in secondary register file 204 based on inputs retrieved from register file 204. Variations of this parallel compound command supported by vector unit 200 include a "negate" form of the instruction in which the result is multiplied by −1, a "subtract" form of the instruction in which the B operands are subtracted from the product of the A and C operands rather than added, and a negate subtract form in which the B operands are subtracted from the product and in which the final result is multiplied by −1.

Additional variations of the multiply add commands supported by vector unit 200 include "cross" commands in which the instruction's registers (target and source) are not all on the same "side" of vector register file 201. Representative of this class of instructions is the cross multiply and add instruction (405) in which the B, C, and T operands are on one side of vector register file 201 while the A operand is taken from the opposite side of the file. (i.e., $A_S C_P + B_P \rightarrow T_P$ and $A_P C_S + B_S \rightarrow T_S$). Variations of the cross commands include cross negate commands (result is multiplied by −1), cross-subtract commands (the B operand is subtracted from the product of the A and C operands), cross-subtract-negate (combination of the subtract and negate commands).

In addition to the basic cross-command variations, vector unit 200 includes support for a set of cross-replicate commands exemplified by the cross replicate primary command (406). In this type of command, at least one of the operands is common to the operation performed on both sides of the vector file (i.e., one operand is command to ALU 220 and ALU 230). In the exemplary instruction set of FIG. 4, the replicated operand is the A operand, but this is an implementation detail and other operand(s) could serve as the replicated operand(s). The replicated operand may come from primary register file 202 or from secondary register file 204.

A further feature of vector unit 200 and instruction set 400 includes support for asymmetric and complex vector instructions exemplified by the instruction 407 and its derivatives. In an asymmetric instruction, the mathematical operation performed by the primary side ALU 220 in response to a particular instruction is different than the mathematical operation performed by the secondary ALU 230 in response to the same instruction. Thus, as depicted in instruction 407, the primary side ALU 220 adds B operand to the product of the A and C operands while the secondary side ALU 230 subtracts the B operand from the product of the A and C operands and negates the result. The instruction 407 further incorporates a cross operand feature in which the A operand is replicated in both ALU's, but it will be appreciated that the instruction's asymmetry (difference in mathematical operations) and replication (duplication of operands) are independent elements.

The complex instructions supported by instruction set 400 and vector unit 200 include the instruction identified by reference numeral 408 and its derivatives. Complex instruction 408 is a specific combination of the cross and asymmetric instructions described above. Complex instruction 408, for example, duplicates the A operand in both ALU's, crosses the C operands, and performs a multiply/add on one side while performing a multiply/subtract and negate on the other side. The complex instructions derive their name from their particular suitability for performing complex multiplication. These instructions enable the inherently asymmetric complex operations to be performed with fewer instructions and fewer register accesses than is possible in strictly parallel SIMD machines. The result is fewer register resource contentions, more instruction slots available for other operations (e.g., loads) and higher computational throughput.

The preceding description describes the use of asymmetric instructions in the context of a vector register file 200. In other embodiments, the asymmetric instructions are implemented in the context of a scalar (non-vector) register file. In such an implementation, a single instruction would perform a first operation on a first set of operands and a second operation on a second set of operands where the first and second operations differ. The first and second sets of operands might be limited to two registers each to simplify instruction execution. An instruction of the form ASYMMULT (A, B, C) might, for example, multiply the contents of register A times the contents of register B and store the result in C and multiply the contents of register A+1 times the contents of register B+1, negate the result and store the result in register C+1.

It will be apparent to those skilled in the art having the benefit of this disclosure that the present invention contemplates a mechanism for securing a pair of mated cable connectors. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A microprocessor, comprising:
a vector unit to execute a vector instruction to perform a first operation on a first set of three operands and a second operation on a second set of three operands, said vector unit configured with three inputs, one for each of the three operands, which are received at the vector unit at approximately a same time;
a vector register file having a primary register file and a secondary register file, each having a first register, a second register and a third register with the operands provided therein;
a plurality of multiplexers each receiving a different first input from the primary register file and a different second input from the secondary register file, wherein the plurality of multiplexers select a single one of the first input and the second input as an output that is provided to one of two arithmetic units;
wherein the vector instruction includes a first register field indicative of a first primary register in the primary register file and a first secondary register in the secondary register file, a second register field indicative of a second primary register in the primary register file and a second secondary register in the secondary register file, and a third register field indicative of a third primary register in the primary register file and a third secondary register in the secondary register file; and wherein the first set of operands includes a first operand selected from the first primary register or the first secondary register, a second operand selected from the second primary register or the second secondary register, and a third operand selected from the third primary register or the third secondary register, wherein the selection of the operands occurs at approximately a same time to provide an input of the three operands to the vector unit via the three inputs.

2. The microprocessor of claim 1, wherein the vector unit includes a 3-input primary arithmetic unit and a 3-input secondary arithmetic unit, wherein the 3-input primary arithmetic unit is configured to perform the first operation on the first set of operands and the 3-input secondary arithmetic unit is configured to perform the second operation on the second set of operands.

3. The microprocessor of claim 2, wherein the first operation includes multiplying two of the three first set of operands to obtain a first product and adding or subtracting the remaining of the first set of operands to or from the first product and wherein the second operation includes multiplying two of the three second set of operands to obtain a second product and adding or subtracting the remaining of the second set of operands to or from the second product.

4. The microprocessor of claim 3, wherein the first and second sets of operands comprise first and second sets of floating point formatted operands.

5. The microprocessor of claim 1, wherein the first and second operations use at least one operand from the primary register file and at least one operand from the secondary register file.

6. The microprocessor of claim 1, wherein the first and second sets of operands include at least one common operand.

7. The microprocessor of claim 1, wherein the vector register file contains information representing a real portion of a complex number in the primary register file and an imaginary portion of the complex number in the secondary register file.

8. The microprocessor of claim 7, wherein the vector unit is configured to execute a complex computation instruction in which the imaginary portion of the first operand of the first set of operands is multiplied by an imaginary portion of a second operand in the first operation and in which the imaginary portion of the first operand is multiplied by a real portion of the second operand in the second operation.

9. The microprocessor of claim 1, wherein the second set of operands include a first operand selected from the first primary register or the first secondary register, a second operand selected from the second primary register or the second secondary register, and a third operand selected from the third primary register or the third secondary register.

10. The microprocessor of claim 1, wherein the vector instruction includes a target register field indicative of a primary target register in the primary register file and a secondary target register in the secondary register file and further wherein the vector unit is further configured to store a result of the first operation in the primary target register and to store a result of the second operation in the secondary target register.

11. A vector unit to process a vector instruction having an opcode and first, second, and third register fields, comprising:
a register file including a primary register file having a set of primary registers and a secondary register file having a set of secondary registers, wherein each register field identifies a register in the primary register file and a corresponding register in the secondary register file, wherein the set of primary registers and set of secondary registers each have a first register, a second register and a third register with operands provided therein;

a plurality of multiplexers each receiving a different first input from the primary register file and a different second input from the secondary register file, wherein the plurality of multiplexers select a single one of the first input and the second input as an output that is provided to one of two arithmetic units;

primary and secondary calculating units, wherein the primary calculating unit includes first, second, and third inputs to receive, respectively, first, second, and third operands of a first set of operands and wherein the secondary calculating unit includes first, second, and third inputs to receive, respectively, first, second, and third operands of a second set of operands;

wherein the first set of operands includes a first operand selected from the first primary register or the first secondary register, a second operand selected from the second primary register or the second secondary register, and a third operand selected from the third primary register or the third secondary register, wherein the selection of the operands occurs at approximately a same time to provide an input of the three operands to the vector unit via the three inputs;

wherein the three operands are received at the vector unit from the register files at approximately a same time; and multiplexing circuitry controlled by the opcode to select each of the first, second, and third operands in the first and second set of operands from the set of primary and secondary file registers identified by the register fields.

12. The vector unit of claim 11, wherein the multiplexing circuitry is controlled by the opcode to select:
the first operand in the first set of operands from either the first primary or the first secondary registers;
the second operand in the first set of operands from either the second primary or the second secondary registers; and
the third operand in the first set of operands from either the third primary or the third secondary registers;
the first operand in the second set of operands from either the first primary or the first secondary registers,
the second operand in the second set of operands from either the second primary, or the second secondary registers; and
the third operand in the second set of operands from either the third primary or the third secondary registers.

13. The vector unit of claim 11, wherein the primary calculating unit is controlled by the opcode to perform a first operation on the first set of operands and the secondary calculating unit is controlled by the opcode to perform a second operation on the second set of operands.

14. The vector unit of claim 13, wherein the first operation differs from the second operation.

15. The vector unit of claim 13, wherein the first and second operations both include multiplying their respective first and third operands to obtain respective first products and adding or subtracting their respective second operands to or from the respective first products.

16. The vector unit of claim 11, wherein the first, second, and third operands of the first and second sets of operands are all floating point formatted operands.

17. A microprocessor including:
an execution unit enabled to execute an asymmetric instruction, wherein the asymmetric instruction includes a set of three operand register fields and a target register field and an operation code (opcode);

a register file accessible by the execution unit and having a rank of two including a primary register file and a secondary register file wherein a value in an operand register field identifies a register in the primary register file and a corresponding register in the secondary register file, wherein the set of primary registers and set of secondary registers each have a first register, a second register and a third register with operands provided therein;

a plurality of multiplexers each receiving a different first input from the primary register file and a different second input from the secondary register file, wherein the plurality of multiplexers select a single one of the first input and the second input as an output that is provided to one of two arithmetic units;

wherein the execution unit is configured to perform a first operation on a first set of three operands selected from registers identified by the set of operand register fields and to perform a second operation on a second set of three operands also selected from the registers identified by the set of operand registers fields wherein the first and second operations and selection of the first and second sets of operands are determined by the opcode;

wherein the first set of operands includes a first operand selected from the first primary register or the first secondary register, a second operand selected from the second primary register or the second secondary register, and a third operand selected from the third primary register or the third secondary register, wherein the selection of the operands occurs at approximately a same time to provide an input of the three operands to the vector unit via the three inputs; and wherein the three operands are received from the register files at approximately a same time.

18. The microprocessor of claim 17, wherein at least one condition selected from a group of conditions consisting of the first and second operations being different and the first and second sets of operands being different is true.

19. The microprocessor of claim 17, wherein the execution unit is further configured to store a result of the first operation in a register of the primary register file determined by the target register field and the result of the second operation in a register of the secondary register field also determined by the target register field.

20. The microprocessor of claim 17, including multiplexing circuitry controlled by the opcode to select a first of the first set of three operands from a first primary and a first secondary register identified by a first operand register field, a second of the first set of three operands from a second primary and a second secondary register identified by a second operand register field, a third of the first set of three operands from a third primary and a third secondary register identified by a first operand register field, a first of the second set of three operands from a first primary and a first secondary register identified by a first operand register field, a second of the second set of three operands from a second primary and a second secondary register identified by a second operand register field, and a third of the second set of three operands from a third primary and a third secondary register identified by a first operand register field.

* * * * *